United States Patent Office 3,414,583
Patented Dec. 3, 1968

3,414,583
COPPER HEXADECAFLUOROPHTHALOCYANINE
David Edward Mudge Wotton, Avonmouth, England, assignor to Imperial Smelting Corporation (N.S.C.) Limited, London, England, a company of Great Britain
No Drawing. Filed June 4, 1965, Ser. No. 461,519
Claims priority, application Great Britain, June 25, 1964, 26,281/64
1 Claim. (Cl. 260—314.5)

This invention relates to a new dyestuff or pigment of the phthalocyanine group.

The parent compound, copper phthalocyanine (which is known as Monastral Blue) is the most important of the phthalocyanine pigments because of its great fastness and beauty. Since its discovery, a whole range of these compounds has been developed in which the hydrogen atoms on the benzene rings are substituted, and of these the best pigments are those in which the hydrogen atoms are substituted by chlorine or bromine atoms.

These compounds are noted for their great stability to heat and to light.

This invention provides a compound (copperhexadecafluorophthalocyanine) in which all the hydrogen atoms of Monastral Blue are substituted by fluorine atoms. The structure is represented by the formula:

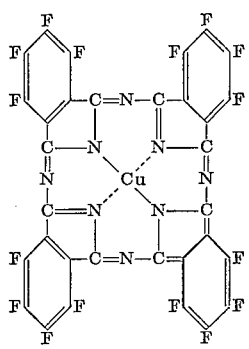

This is the first time that a perfluorophthalocyanine has been synthesized.

The substance is an intense royal blue powder, soluble in organic solvents such as alcohol, acetone or dimethyl formamide and has very great resistance to heat and to chemical oxidation.

The invention further includes a pigment containing the above fluorinated phthalocyanine as its active colouring principle.

The dyestuffs industry is continually seeking pigments with improved stability when subjected to heat or oxidising agents. This is particularly necessary for pigments which are to be used in the plastics or manmade fibres industry. The new pigment provides a material which is suitable for use in these industries and which shows good heat-stability and oxidation-resistant properties compared to known pigments of this type. The compound also has utility as a solid lubricant and as a catalyst.

The invention further consists of a method of preparing the fluorinated phthalocyanine described above in which tetrafluorophthalonitrile is allowed to react with cuprous chloride in a polar aprotic solvent, e.g. N-methylpyrrolidone. The reaction may conveniently be carried out by boiling under reflux at atmospheric pressure.

The tetrafluorophthalonitrile may be present from a 1.5:1 to a 3:1 molar ratio compared to the cuprous chloride, but generally, for economy and to avoid by-products, about a 2:1 molar ratio is preferred.

The details of a typical preparation are described below in Example 1, in which temperatures are shown in degrees centigrade.

EXAMPLE 1

Tetrafluorophthalonitrile (2.0 g., 0.01 mole) and cuprous chloride (0.5 g., 0.005 mole) were boiled together under reflux in N-methyl pyrrolidone for 2 hours.

The mixture was poured into aqueous hydrochloric acid, and the resulting suspension was filtered at the pump, the precipitate washed with boiling water, and dried at 120° although temperatures above this could readily be used. The dark blue powder weighed 2.0 g.

The product of the reaction was identified as copper hexadecafluorophthalocyanine in the following ways:

1. Source

The method by which the material was prepared would suggest that it is copper hexadecafluorophthalocyanine (see Linstead and Lowe, J. Chem. Soc., 1934, 1022).

2. Elemental analysis

Found: C, 44.5; F, 34.6; N, 13.0. $C_{32}F_{16}N_8Cu$ requires C, 44.4; F, 35.2; N, 13.0; Cu, 7.5%.

3. Spectra (A) ULTRA-VIOLET AND VISIBLE SPECTRUM

The spectrum of copper phthalocyanine in 1-chloronaphthalene is given by G. E. Ficken and R. P. Linstead, J. Chem. Soc., 1952, 4849, and, more accurately by M. Whalley, J.C.S., 1961, 866–869. The spectrum of copper hexadecafluorophthalocyanine in 1 - chloronaphthalene has been examined, the solution being made up by the method described by Whalley (loc. cit., 869).

The profile of the spectrum is almost exactly the same as that published by Ficken and Linstead. The four main peaks are at:

3,425 A.
6,200 A.
6,575 A.
6,875 A.

According to Whalley, the ratio of the intensities of the three main peaks in the visible range of the copper phthalocyanine spectrum is:

4.56:4.51:5.34=1:0.99:1.17

The ratio of the intensities of the three main peaks in the visible range of the copper hexadecafluorophthalocyanine spectrum is:

4.31:4.25:5.01=1:0.99:1.16

(B) INFRA-RED SPECTRUM

This spectrum is very similar to that described in the Official Digest of the Federation of Societies for Paint Technology, March 1961, part 2, page 135 for both copper phthalocyanine and copper polychlorophthalocyanine (Monastral Green).

4. Oxidation

The product of oxidation with concentrated nitric acid is tetrafluorophthalimide (See Gething, Patrick and Tatlow, J. Chem. Soc., 1961, 1575).

The pigment shows greater stability to oxidising agents (e.g. nitric acid, acid permanganate, acid $KMnO_4$ and ceric salts) than does copper phthalocyanine. It is soluble in concentrated sulphuric acid, ethanol, acetone and dimethylformamide. It is insoluble in water.

Experimental evidence is given below in Examples 2–4 to show the improved oxidation resistance of the new pigment when compared to copper phthalocyanine.

EXAMPLE 2

Oxidation with concentrated nitric acid (Dent and Linstead, J.C.S., 1934, 1030)

(a) Copper phthalocyanine (1 g.) was added to concentrated nitric acid (4 cc.) in a test tube. A spontaneous reaction took place at room temperature, nitrous fumes were evolved, and the pigment was rapidly decolourised, a greenish brown solution being produced within a few minutes.

(b) In a comparative experiment, copper hexadecafluorophthalocyanine (1 g.) was added to concentrated nitric acid (4 cc.) in a test tube. No spontaneous reaction took place at room temperature. On warming, the reaction began, with evolution of nitrous fumes, but after ten minutes a large proportion of the pigment remained unaffected. A further 4 cc. of concentrated nitric acid were added, and the mixture was boiled until no further blue pigment could be observed, and a clear solution was obtained. This required at least a further five minutes heating.

EXAMPLE 3

Oxidation with acid permanganate

According to Dent and Linstead (loc. cit.), copper phthalocyanine is readily oxidised by acidic potassium permanganate. Under identical conditions copper hexadecafluorophthalocyanine could not be completely oxidised.

EXAMPLE 4

Oxidation of ceric sulphate

According to Dent and Linstead, copper phthalocyanine is readily oxidised by ceric sulphate. Under identical conditions, copper hexadecafluorophthalocyanine could not be completely oxidised.

Various modifications may be made with the scope of the invention.

I claim:
1. Copper hexadecafluorophthalocyanine.

References Cited

UNITED STATES PATENTS

| | | | |
|---|---|---|---|
| 2,242,301 | 5/1941 | Heilbron et al. | 260—314.5 |
| 2,277,629 | 3/1942 | Bradbrook et al. | 260—314.5 |

FOREIGN PATENTS

| | | |
|---|---|---|
| 679,018 | 1/1964 | Canada. |
| 470,079 | 8/1937 | England. |
| 8,473 | 1963 | Japan. |
| 17,479 | 1963 | Japan. |

HENRY R. JILES, *Primary Examiner.*

H. I. MOATZ, *Assistant Examiner.*